Aug. 21, 1956

A. W. RECHTEN ET AL 2,760,182

APPARATUS FOR DETECTING THE MOVEMENT
OF OBJECTS OF MAGNETIC MATERIAL

Filed Feb. 18, 1952

INVENTOR
Adolf Wilhelm Rechten
and Brian Maynard Bellman
BY
Dezsoe Steinherz
ATTORNEY Aug. 21, 1956     A. W. RECHTEN ET AL     2,760,182
APPARATUS FOR DETECTING THE MOVEMENT
OF OBJECTS OF MAGNETIC MATERIAL
Filed Feb. 18, 1952     2 Sheets-Sheet 2
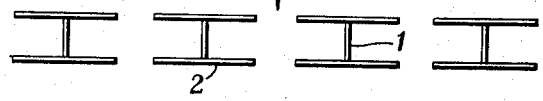
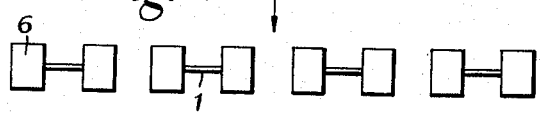
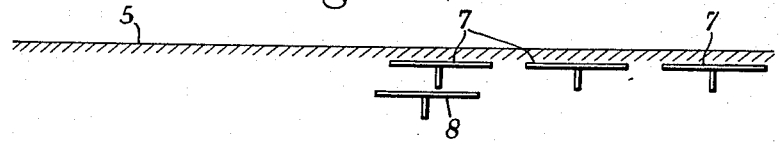
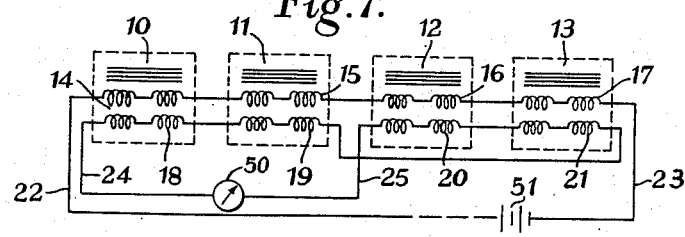
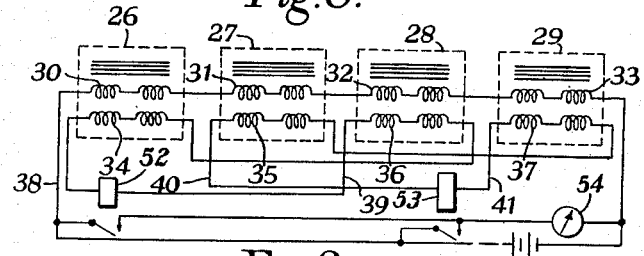
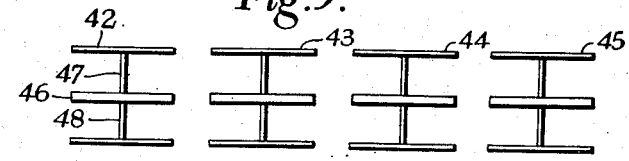
INVENTOR
Adolf Wilhelm Rechten and Brian Maynard Bellman
BY
Dezsoe Steinberg
ATTORNEY

United States Patent Office 2,760,182
Patented Aug. 21, 1956

2,760,182

APPARATUS FOR DETECTING THE MOVEMENT OF OBJECTS OF MAGNETIC MATERIAL

Adolf W. Rechten and Brian M. Bellman, Taplow, England, assignors to British Telecommunications Research Limited, Taplow, England, a British company Application February 18, 1952, Serial No. 272,196

Claims priority, application Great Britain February 20, 1951

7 Claims. (Cl. 340—38)

The present invention relates to apparatus for detecting the movement of objects composed of or including magnetic material and is particularly suitable for detecting the passage of vehicles in a roadway or other traffic path. The detector contemplated is of the non-contact type in which an electrical impulse is generated due to the passage of the vehicle and the chief object of the invention is to provide an arrangement whereby the impulse shall be as great as possible while at the same time the detector is protected from unwanted operation, for instance by extraneous magnetic fields or by vehicles passing on the other side of the road or in the opposite direction. Such a detector possesses the advantage of all equipment of this type in that there are no moving parts and the surface of the road does not need to be broken or disturbed and consequently the detector can be made to stand up to very heavy traffic and adverse weather conditions. The sensitivity can be such that pedal cycles are detected satisfactorily.

According to the invention the detector is formed of a unit comprising a U-shaped core of magnetic material provided with elongated polepieces located adjacent to the surface so that the polepieces lie in a plane parallel thereto, the core being provided with one or more windings adapted to generate an electrical impulse in response to the movement of an object of magnetic material along the surface. The polepieces are preferably elongated in a direction at right angles to the plane of the core so that a fairly high proportion of the lines of force bridge the air gap above the detector.

The invention will be better understood from the following description of various embodiments which should be taken in conjunction with the accompanying drawings comprising Figs. 1 to 9.

Of these, Figs. 1 to 3 show respectively a front elevation, a plan view and a side elevation of a detector unit according to the invention.

Figs. 4 and 5 show two alternative methods of mounting a series of detector units across a road or other track.

Fig. 6 indicates a mounting arrangement designed to produce a comparatively sharp cut-off at a particular point, for instance in the middle of a road in order to ensure the detection of traffic flowing in one direction only.

Fig. 7 shows the electrical connections of a plurality of units and indicates the arrangement for producing decoupling between the pick-up and magnetising windings of the units.

Fig. 8 shows an arrangement designed to produce a substantially uniform response throughout the area covered by a plurality of units, and Fig. 9 shows a possible method of combining detector units where it is desired to secure a uni-directional property, that is to say the detector will give indications of traffic in one direction but not of traffic in the opposite direction.

Figure 1:
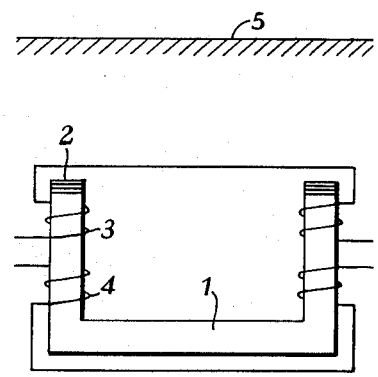
Figure 2:
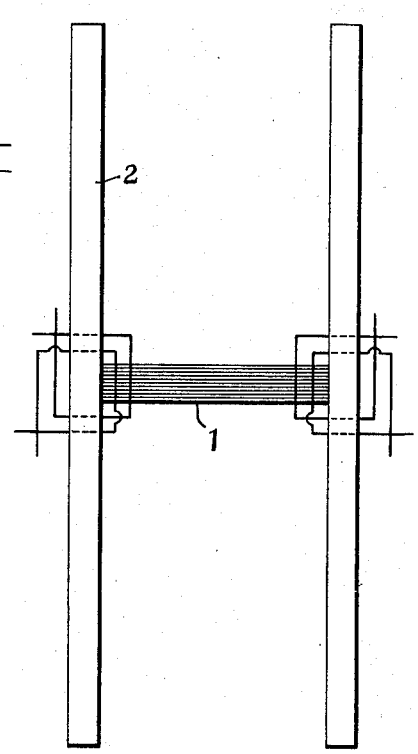
Figure 3:
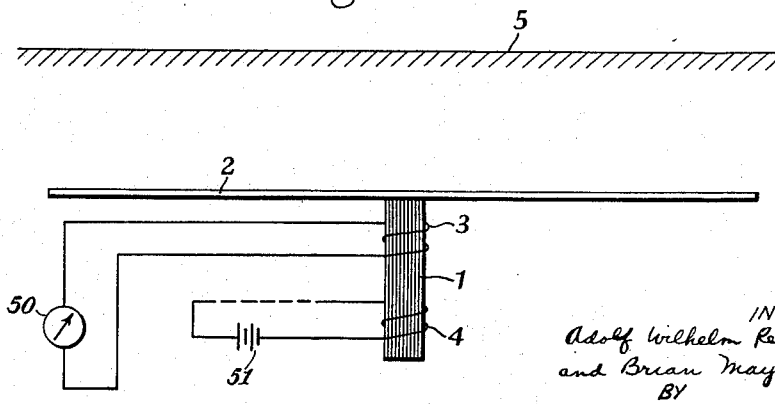

Referring first to the constructional details shown in Figs. 1, 2 and 3, the detector comprises essentially a U-shaped core 1 which is laminated and preferably constructed of standard sheet material as used for transformers. Conveniently the laminations are of a thickness of about .015 inch and the material used is preferably that known under the trade name "Radiometal" or other alloy having similar properties, which is given a specific premagnetisation. The properties in question are primarily high permeability as low field strength and low hysteresis loss. The polepieces 2 extend for some distance on either side of the plane of the core and these are also preferably laminated but may be constructed of material with inferior magnetic properties such as mild steel since the magnetic properties of the polepieces are of less importance than those of the core. The core has a pick-up winding 3 and a magnetising winding 4 on each limb, the corresponding windings on each limb being preferably connected in series as shown in Fig. 1 while the external connections can be made direct to the indicating device 50 or as shown in Figs. 7 and 8. The detector unit is mounted with the plane of the polepieces parallel to the surface 5 along which the objects of magnetic material, here assumed to be vehicles, are arranged to move. Generally speaking the detector should be located as near the surface as possible in order to increase its sensitivity and since it is extremely unlikely that the detector will need any attention once it is installed, it may conveniently be encased in a solid block of concrete the upper surface of which forms the surface of the road or it may be embedded in the road during the surfacing work. It will be appreciated that with the relative dimensions shown, a high proportion of the magnetic lines of force will bridge the airgap above the detector.

The magnetising windings 4 are preferably traversed by a steady direct current from a source 51 which increases the sensitivity of the device over the case in which only the earth's magnetic field is employed. This arrangement for obtaining increased sensitivity by the use of magnetising windings and by mounting close to the operative surface enables the detector to be made of small size and this reduces the cost and gives improved operation since the detector is not so likely to be affected by extraneous fields.

If the detector unit is of small size, as is contemplated, a number of units will be required if half the width of the road is to be covered and this affords various possibilities in the arrangement and interconnection of the different units forming the complete detector. It will generally be most convenient for the detectors to be mounted so that the lines of force between the polepieces extend in the direction of traffic movement, that is to say the elongated polepieces will be at right angles to this direction. This arrangement is shown in Fig. 4, where four units of the construction shown in Figs. 1–3 are assumed to be used and the arrow indicates the direction of traffic movement.

It is possible, however, to use the detectors turned through 90° so that the lines of force extend across the direction of traffic flow, and in this case it is preferable to employ polepieces in the form of flat plates. This arrangement is shown in Fig. 5 where the arrow again indicates the direction of traffic flow and four units are employed. In this case however the cores 1 are arranged across the direction of traffic flow and the detectors are provided with polepieces in the form of flat plates 6.

With the use of a number of units placed end to end it is to be expected that unless special care is taken the sensitivity curve will not be constant but since the combined curve is the sum of the curves for individual units there are likely to be appreciable changes at the points between adjacent units. A satisfactory degree of uniformity can be obtained however by adjustment of the spacing and possibly the depth of mounting and if necessary by adjusting the sensitivity of individual units.

It may however be desirable to obtain a sharp drop in sensitivity at one end at least of the line of units, for instance in the middle of the road, and this may be effected by the use of a so-called buffer detector which is located at the point where the sensitivity is required to change abruptly and which is connected in opposition to the adjacent detectors. This buffer detector moreover may be located at a different depth beneath the road surface compared with the remaining units and may overlap the adjacent unit to a greater or less extent. This arrangement is shown in Fig. 6 where the road surface is again indicated by 5 and three units 7 are provided together with a buffer unit 8 which is shown as mounted appreciably farther from the road surface 5 and overlaps the adjacent unit 7.

If the detectors are provided, as is assumed, with both pick-up and magnetising coils, it is very desirable that the coils of the two kinds should be decoupled in order to prevent operation of the detector in response to changes in the supply voltage to the magnetising coils. This is not so necessary in respect of slow changes which may occur at different times of the day owing to changes in the load on the supply system but is intended to minimise effects resulting from the presence of a ripple on the direct current supply which is likely if this is obtained from the supply mains by the use of a rectifier. Difficulties in this respect may be overcome however if either the operating coils or the coils of adjacent detector units are connected in opposition as by this means impulses due to variations in the supply voltage are balanced out.

This method of connection is shown in Fig. 7 which indicates four detector units 10, 11, 12 and 13 each provided with magnetising coils 14 to 17 and pick-up coils 18 to 21. It will be seen that all the magnetising coils 14, 15, 16 and 17 are connected in series and are fed from a D. C. source connected to leads 22 and 23, while pick-up coils 18 and 19 of units 10 and 11 are connected in series and similarly pick-up coils 20 and 21 of units 12 and 13 are connected in series but the two pairs are connected in opposition and provide an output to the indicating device 50 over leads 24 and 25.

A theoretical disadvantage of this arrangement is that in the plane of symmetry between two detector units, the pick-up coils of which are connected in opposition, the sensitivity will be very much reduced and a vehicle operating effectively in this plane may produce no signal, but it is found in practice that this difficulty is not serious. It can however be virtually eliminated if the detector units in the two groups which are connected in opposition are staggered in the direction of movement of traffic. This expedient is based on the fact that the signal produced by the passage of a vehicle represent a series of sine waves corresponding to the individual magnetic components so that if the detectors are placed a distance apart in the direction of movement of traffic such that the signals are displaced in time by an interval equal to half the duration of the resultant signal wave the fact that the coils are connected in opposition will mean that the waves in opposite senses are superposed and a signal is obtained comparable with that obtained when the detectors are all in line and connected in series.

A further possibility is indicated in Fig. 8 where four units 26, 27, 28 and 29 are shown which have their magnetising coils 30, 31, 32 and 33 connected in series as in the previous arrangement. Pick-up coils 34 and 36 of the alternate units 26 and 28 are connected in series opposition and similarly pick-up coils 35 and 37 of units 27 and 29. The output of coils 34 and 36 extends by way of leads 38 and 39 to relay 52 while the output of coils 37 and 39 extends by way of leads 40 and 41 to relay 53. Each of these relays is arranged on operation to complete a circuit for the indicating device 54. It may be arranged if desired that each output circuit extends to an amplifier in order to provide sufficient current for the reliable operation of the relays. With this arrangement the question of a dead area between adjacent units does not arise and the effective sensitivity remains substantially constant over the whole width covered by the detector units.

In some circumstances where it cannot be ensured that substantially all the traffic will pass over the detector in one direction only, it may be desirable to ensure a unidirectional effect by the provision of two rows of detector units placed a short distance apart so that the signals picked up thereby will be displaced in time by a small amount. The circuits are then arranged, for instance by the use of electro-magnetic relays, so that the responding equipment is only operated if a signal is received from one line of detectors before a signal is received from the other line, but not vice versa. Moreover it can readily be arranged that simultaneous operation does not affect the receiving equipment so that a further safeguard is obtained from extraneous fields giving a false detection indication.

It is found that with such an arrangement the spacing of the double line of detectors to give a uni-directional effect is such that it may be convenient to combine the detectors by making use of a common central polepiece, thus economising space and simplifying the work of installation. Such an arrangement is shown in Fig. 9 where a complete detector is formed of four double units 42—45 each provided with a central polepiece such as 46 which serves for the two individual cores 47 and 48 forming the unit.

The use of two lines of detectors also presents the possibility of determining the speed of a vehicle by measuring the time period between the pulses obtained from the two lines of detectors.

We claim:

1. A detector for detecting the passage of free vehicles in a traffic lane on a highway, comprising a U-shaped core of magnetic material, elongated polepieces for said core extending in a direction at right-angles to the plane of said core and transverse to the direction of said traffic lane and located in a plane adjacent and parallel to the surface of said highway, a winding on said core and indicating equipment connected to said winding, and a responsive to the E. M. F. generated therein by the passage of a vehicle along said traffic lane.

2. A detector for detecting the passage of free vehicles in a traffic lane on a highway, comprising a laminated U-shaped core of magnetic material having the properties of low hysteresis loss and high permeability at low field strength, elongated polepieces for said core extending in a direction at right-angles to the plane of said core and located in a plane adjacent and parallel to the surface of said highway, a winding on said core and indicating equipment connected to said winding and responsive to the E. M. F. generated therein by the passage of a vehicle along said traffic lane.

3. A detector for detecting the passage of free vehicles in a traffic lane on a highway, comprising a plurality of units mounted in line transversely across said traffic lane, each unit consisting of a U-shaped core of magnetic material, elongated polepieces for said core extending in a direction at right-angles to the plane of said core and parallel to said line of units, a pick-up winding mounted on said core and a magnetising winding mounted on said core, a source of direct current indicating equipment, means for connecting half the total number of said pick-up windings in series to said indicating equipment in opposition to the remainder of said pick-up windings connected in series and means for connecting all said magnetising windings in series to said direect current source.

4. A detector for detecting the passage of free vehicles in a traffic lane on a highway, comprising indicating equipment and a plurality of units each consisting of a U-shaped core of magnetic material provided with elongated polepieces extending in a direction at right-angles to the plane of said core and transverse to the direction of said traffic lane and a winding on said core, the polepieces of different units being located parallel to the surface of said highway but at different distances therefrom and all said windings being connected in a series to said indicating equipment.

5. A detector for detecting the passage of free vehicles in a traffic lane on a highway, comprising indicating equipment and a plurality of units each consisting of a U-shaped core of magnetic material provided with elongated polepieces extending in a direction at right-angles to the plane of said core and transverse to the direction of said traffic lane and a winding on said core, said units being arranged in a line transversely across said traffic lane with their polepieces parallel to the surface of said highway and said windings being connected in series to said indicating equipment with the winding of the unit at the extremity of the line reversed compared with the windings of the remaining units.

6. A detector for detecting the passage of free vehicles in a traffic lane on a highway, comprising indicating equipment, two electrical responding devices and a plurality of units each consisting of a U-shaped core of magnetic material provided with elongated polepieces extending in a direction at right-angles to the plane of said core and transverse to the direction of said traffic lane and a winding on said core, said units being arranged in line transversely across said traffic lane with their polepieces parallel to the surface of said highway, means for connecting the windings of alternate units to one of said responding devices, means for connecting the windings of the remaining units to the other of said responding devices and means separately controlled by each of said responding devices for operating said indicating equipment.

7. A detector for detecting the passage of free vehicles in a traffic lane on a highway, comprising two U-shaped magnetic cores located side-by-side in the same plane parallel to the direction of said traffic lane, elongated polepieces on said cores located parallel to the surface of said highway and extending in a direction at right-angles to the plane of said cores, the central polepiece being common to both of said cores, windings on each of said cores, a first set of electrical responding equipment connected to the winding on said first core, a second set of electrical responding equipment connected to the winding on said second core, a third set of electrical responding equipment and interconnections between said first, second and third sets of responding equipment whereby said third set of responding equipment is operated if a vehicle passes along said traffic lane in one direction but not if it passes in the opposite direction.

References Cited in the file of this patent

UNITED STATES PATENTS

| | | |
|---|---|---|
| 634,388 | Boult | Oct. 3, 1899 |
| 1,798,256 | Grondahl | Mar. 31, 1931 |
| 1,806,500 | Rice | May 19, 1931 |
| 1,962,236 | Dodd | June 12, 1934 |
| 2,064,882 | Brainerd | Dec. 22, 1936 |
| 2,144,535 | Horni | Jan. 17, 1939 |
| 2,179,240 | Breitenstein | Nov. 7, 1939 |
| 2,223,992 | Horni | Dec. 3, 1940 |
| 2,228,293 | Wurzbach | Jan. 14, 1941 |
| 2,228,294 | Wurzbach | Jan. 14, 1941 |

FOREIGN PATENTS

| | | |
|---|---|---|
| 526,803 | Great Britain | Sept. 26, 1940 |
| 992,445 | France | Oct. 18, 1951 |